United States Patent
Scott

(12) 
(10) Patent No.: US 6,683,262 B2
(45) Date of Patent: Jan. 27, 2004

(54) APPARATUS FOR MOVING BAGGAGE TO A CONVEYOR

(76) Inventor: William M. Scott, P.O. Box 998, Fort Worth, TX (US) 76101

( * ) Notice: Subject to any disclaimer, the term of this patent is extended or adjusted under 35 U.S.C. 154(b) by 104 days.

(21) Appl. No.: 09/844,957

(22) Filed: Apr. 27, 2001

(65) Prior Publication Data

US 2002/0157878 A1 Oct. 31, 2002

(51) Int. Cl.$^7$ .................... G01G 19/00; B65G 41/00
(52) U.S. Cl. ........................ 177/145; 198/301
(58) Field of Search ................ 177/119, 145, 177/136; 198/300, 301

(56) References Cited

U.S. PATENT DOCUMENTS

| | | | | |
|---|---|---|---|---|
| 5,143,194 A | * | 9/1992 | Sang | 198/301 |
| 5,150,760 A | * | 9/1992 | Johnson | 177/136 |
| 5,170,857 A | * | 12/1992 | Phillips et al. | 177/145 |
| 5,393,937 A | * | 2/1995 | Etherington et al. | 177/145 |
| 5,959,257 A | * | 9/1999 | Campbell et al. | 177/136 |
| 6,329,613 B1 | * | 12/2001 | Tomlinson | 177/145 |
| 6,407,348 B1 | * | 6/2002 | Scott | 177/145 |

* cited by examiner

*Primary Examiner*—Randy Gibson
(74) *Attorney, Agent, or Firm*—Geoffrey A. Mantooth; Arthur F. Zobal

(57) ABSTRACT

The system comprises a lower frame, an upper frame coupled to the lower frame, and wheels coupled to the lower frame for engagement with a base for supporting the upper and lower frames and for moving the two frames. A conveyor belt is supported by the upper frame for supporting and moving baggage placed on the belt. A load sensor is coupled to the lower frame for supporting the upper frame for determining the weight of the baggage placed on the belt. A frame drive is coupled to the lower frame for moving the two frames between loading and unloading positions. In addition, a belt drive is provided for moving the belt and baggage thereon off of the belt when the apparatus is located at the unloading position.

26 Claims, 15 Drawing Sheets

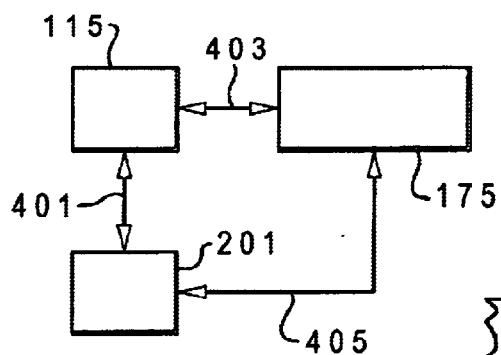
Fig. 16
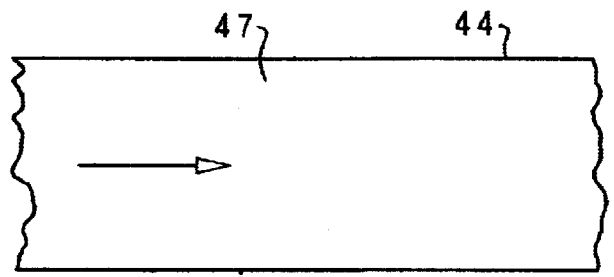
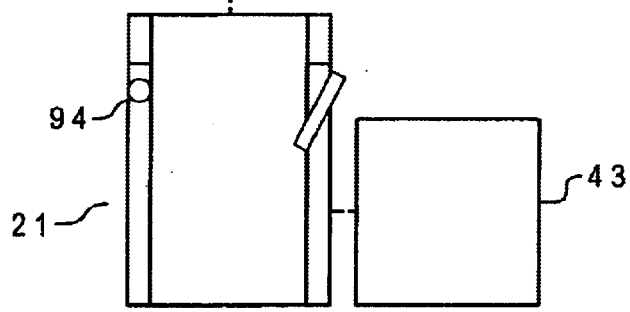
Fig. 17
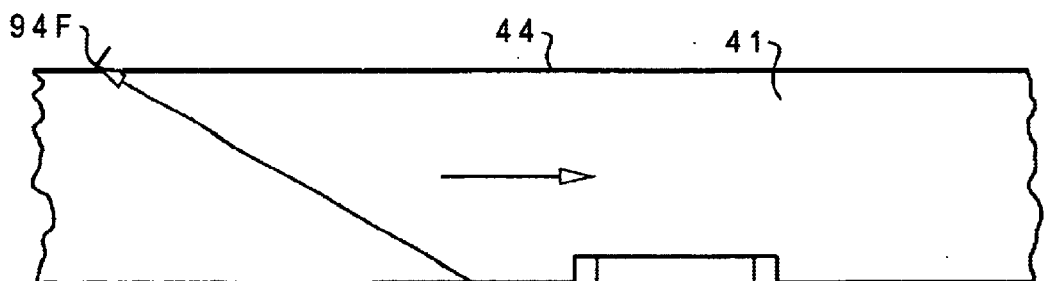
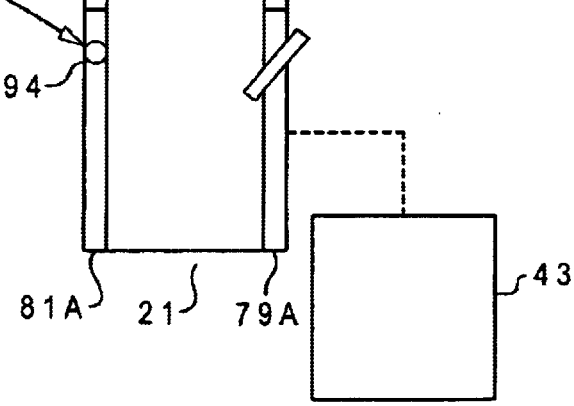
Fig. 18

APPARATUS FOR MOVING BAGGAGE TO A CONVEYOR

BACKGROUND OF THE INVENTION

1. Field of the Invention

The invention relates to an apparatus for loading baggage from a scale to a conveyor system at an airport.

2. Description of the Prior Art

In the past, at airports, bags have been loaded manually from scales to a conveyor system behind the counter and scales. This has resulted in numerous injuries to the personnel over the years due in part to the weight of the bags.

SUMMARY OF THE INVENTION

It is an object of the invention to provide a new and useful baggage handling system for moving bags from a scale to the conveyor system.

The system comprises a lower frame, an upper frame coupled to the lower frame, and wheels coupled to the lower frame for engagement with a base for supporting the upper and lower frames and for moving the two frames. A conveyor belt is supported by the upper frame for supporting and moving baggage placed on the belt. A load sensing means is coupled to the lower frame for supporting the upper frame for determining the weight of the baggage placed on the belt. A frame drive means is coupled to the lower frame for moving the two frames between loading and unloading positions. In addition, a belt drive means is provided for moving the belt and baggage thereon off of the belt when the apparatus is located at the unloading position.

In the embodiment disclosed, the frame drive means is coupled to the base and engages a track coupled to the lower frame for moving the apparatus from the loading position to the unloading position and back to the loading position.

In addition the load sensing means supports the upper frame for producing and output which reflects the weight of the baggage placed on the belt.

BRIEF DESCRIPTION OF THE DRAWINGS

In FIGS. 11 and 12 the electrical leads on the left of FIG. 11 are coupled to the corresponding leads on the right of FIG. 12.

FIG. 16 is a plan view of the tram at the loading position.

FIG. 17 is a plan view of the tram at the unloading position.

FIG. 18 is a block diagram of the panel, weighting module, and the programmable logic controller.

DESCRIPTION OF THE PREFERRED EMBODIMENTS

Figure 1:
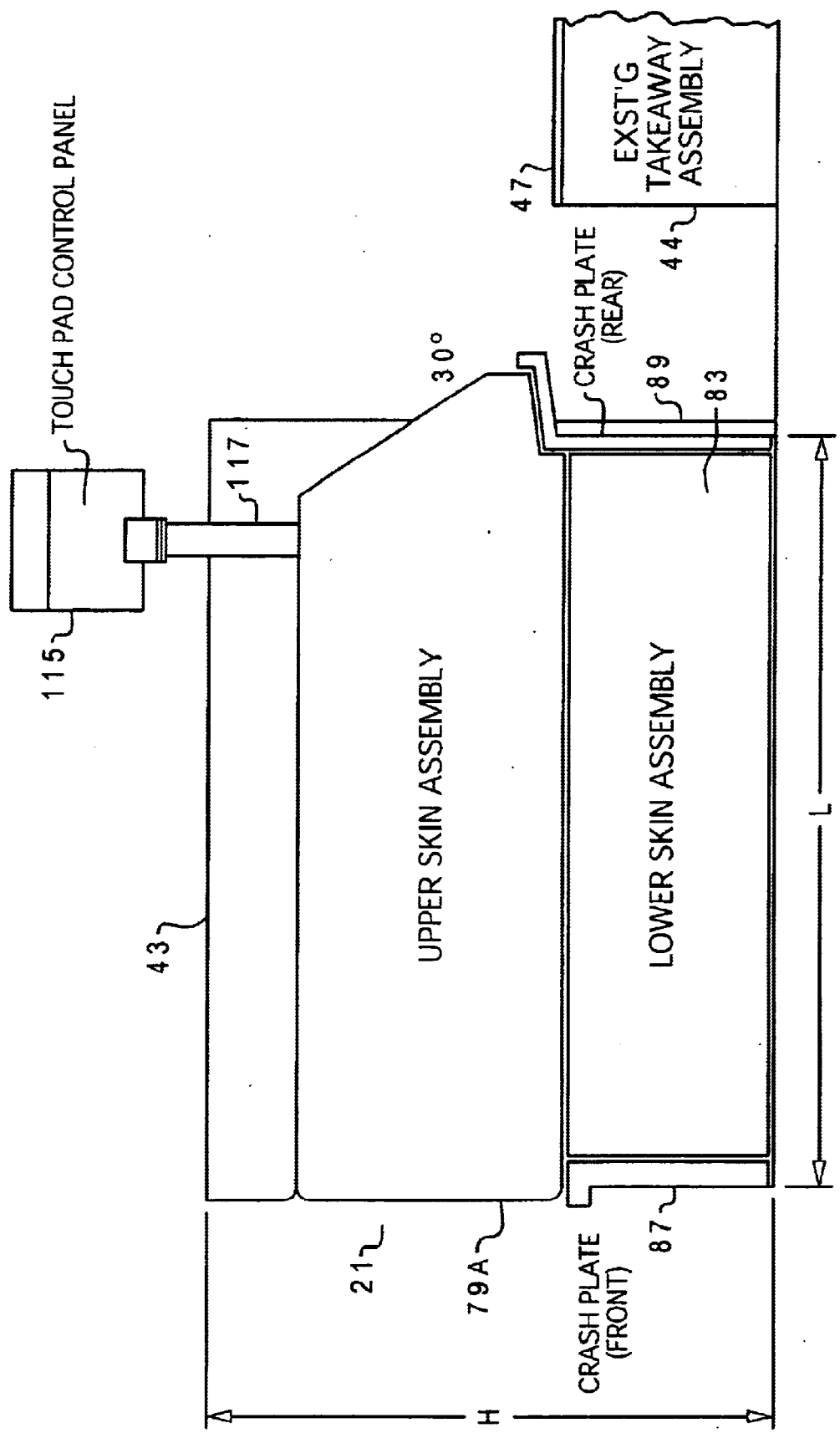
FIG. 1 is a side view of the apparatus of the invention.
Figure 2:
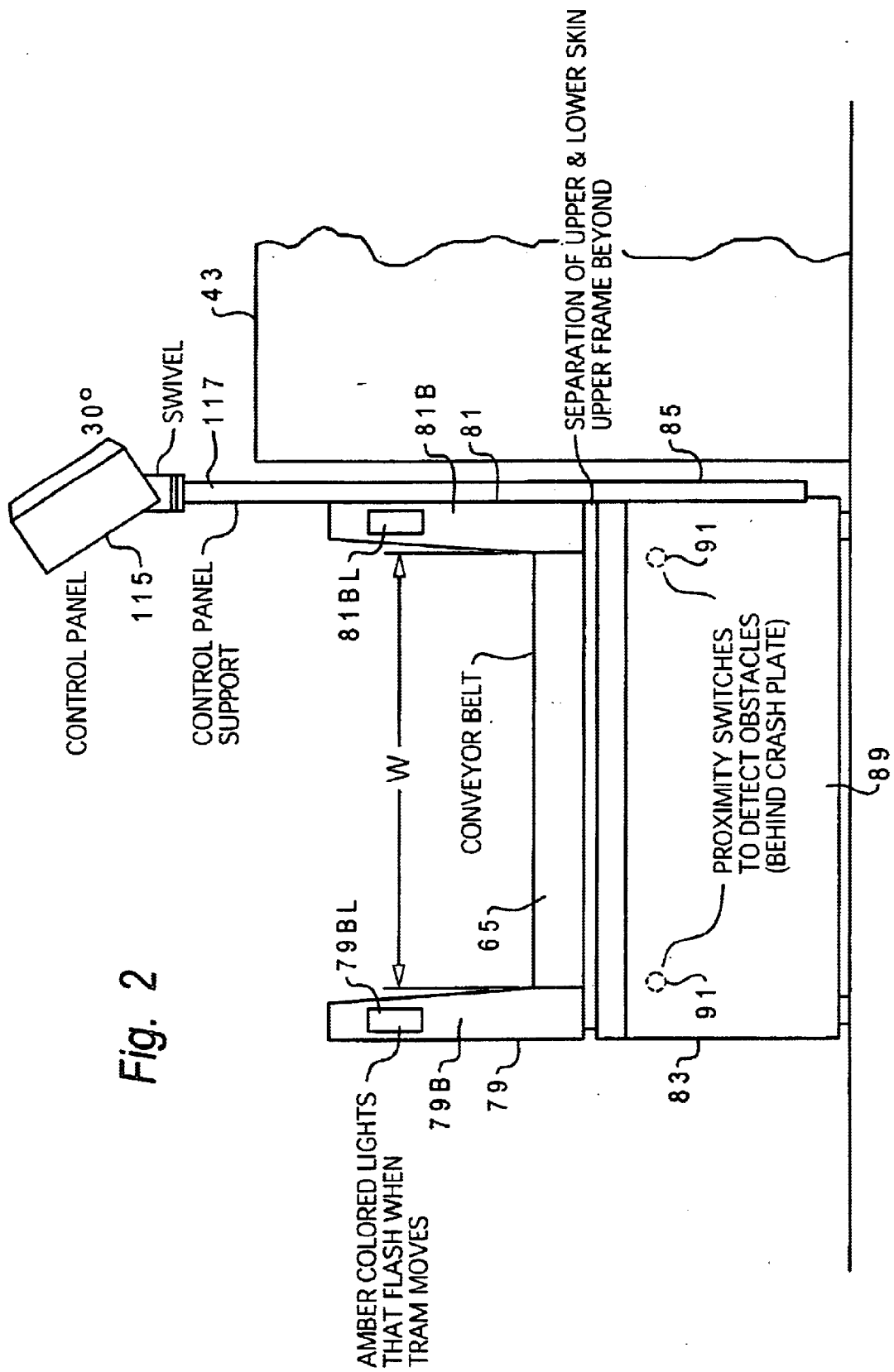
FIG. 2 is a rear view of the apparatus as seen from the position of the agent.
Figure 3:
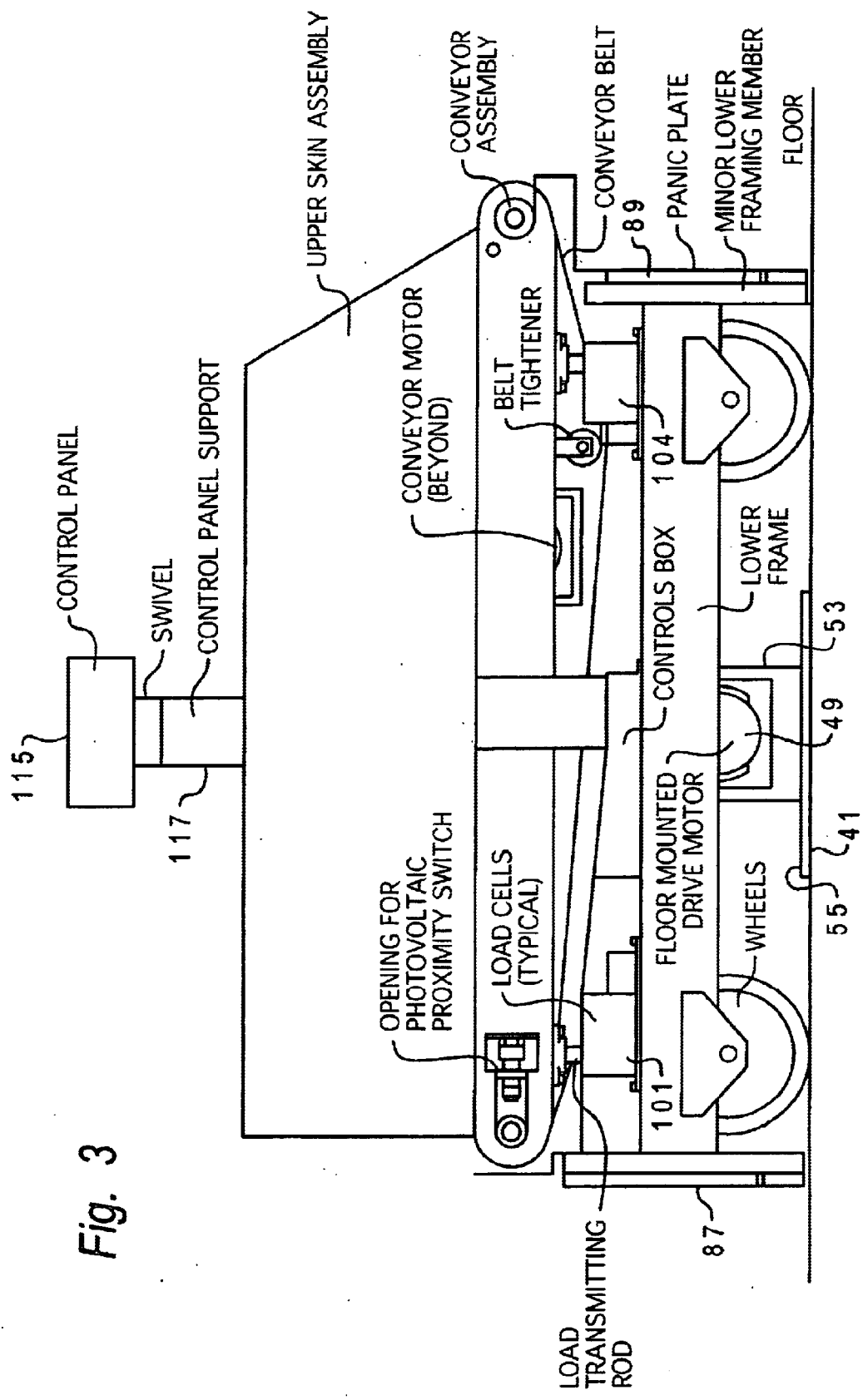
FIG. 3 is a side view of the apparatus similar to that of FIG. 1 but with the paneling removed to show more detail.
Figure 4:
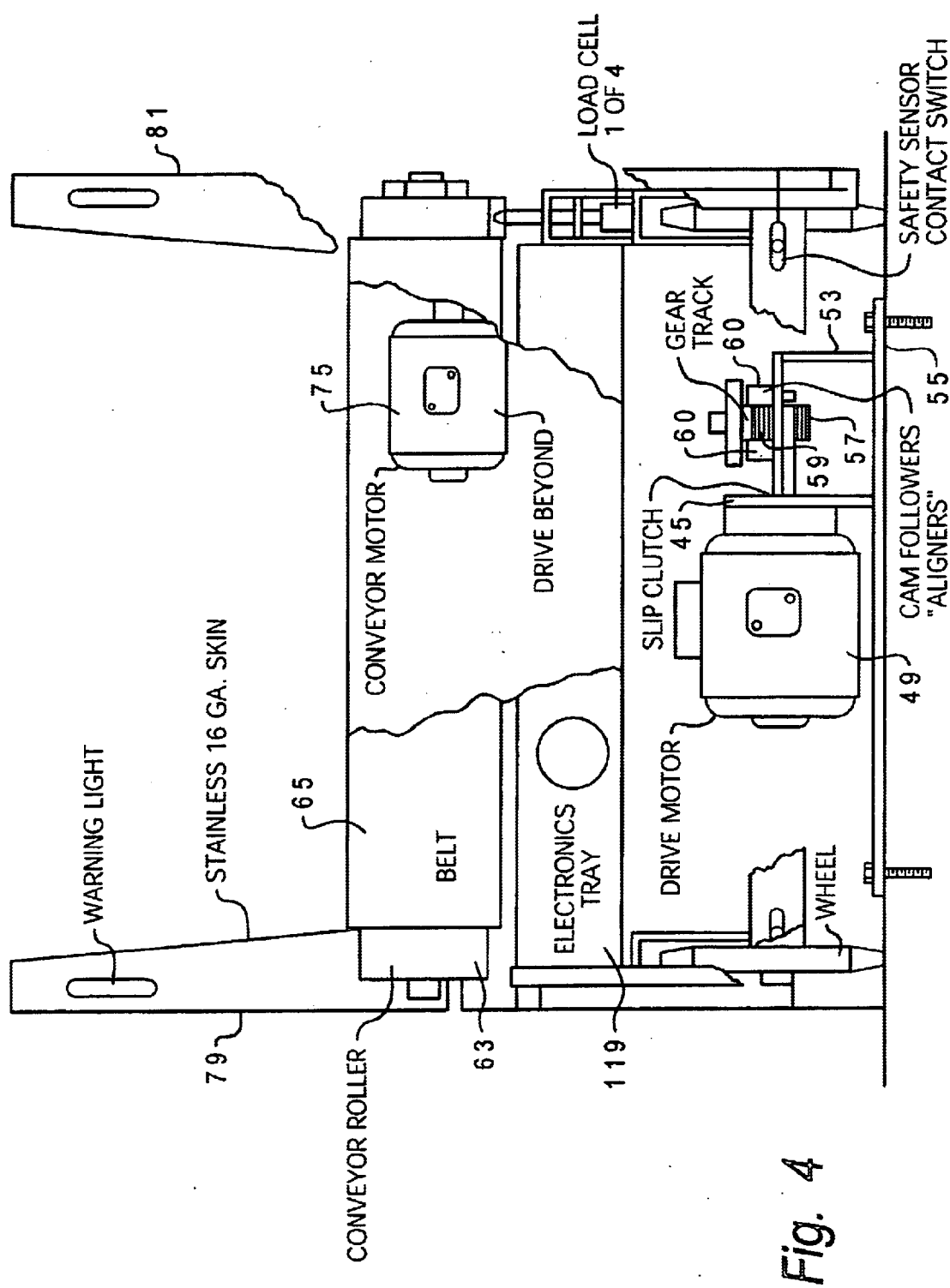
FIG. 4 is a rear view of the apparatus showing more detail of the components thereof.
Figure 5:
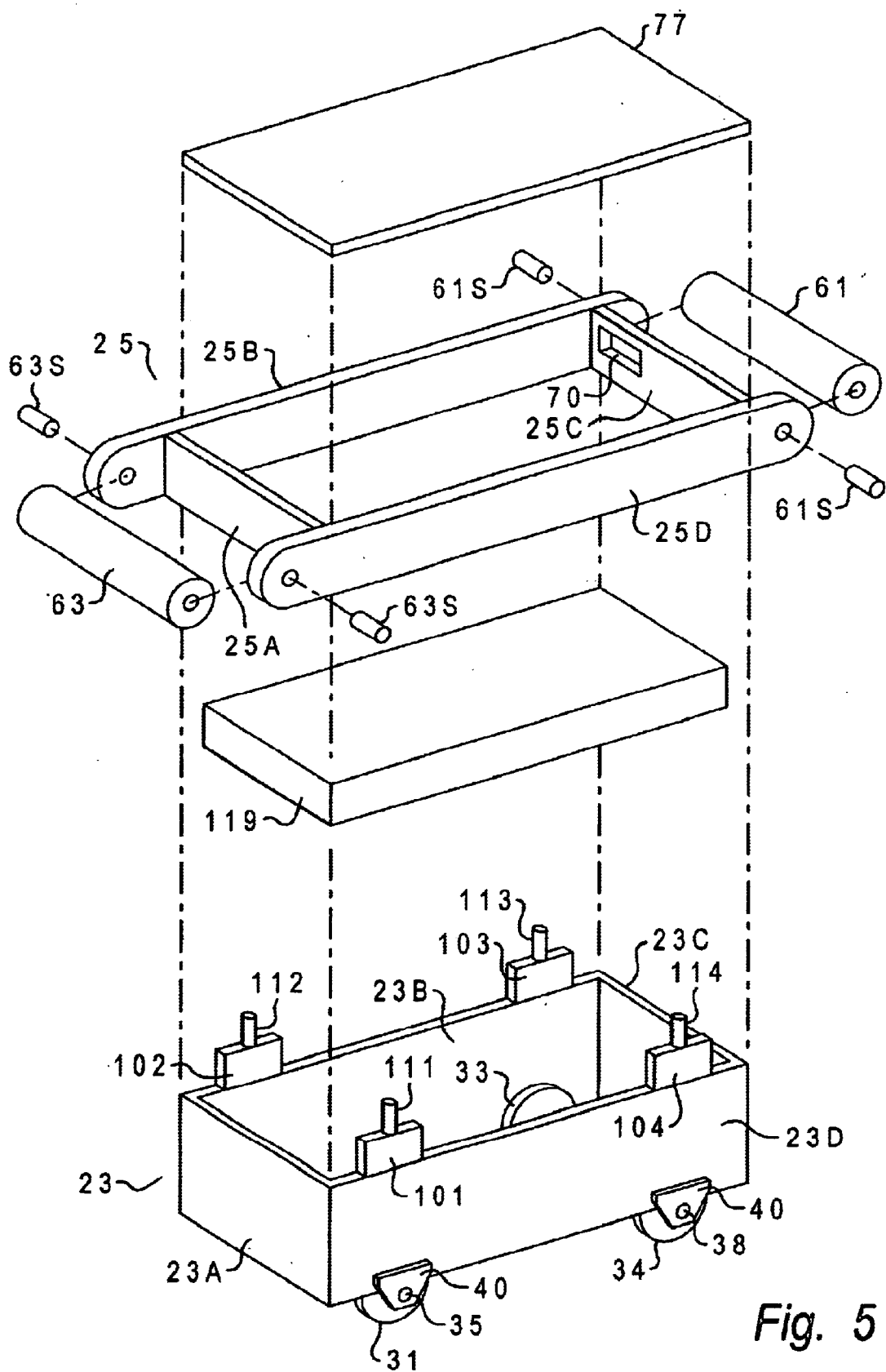
FIG. 5 is an exploded view of the frame of the apparatus.
Figure 6:
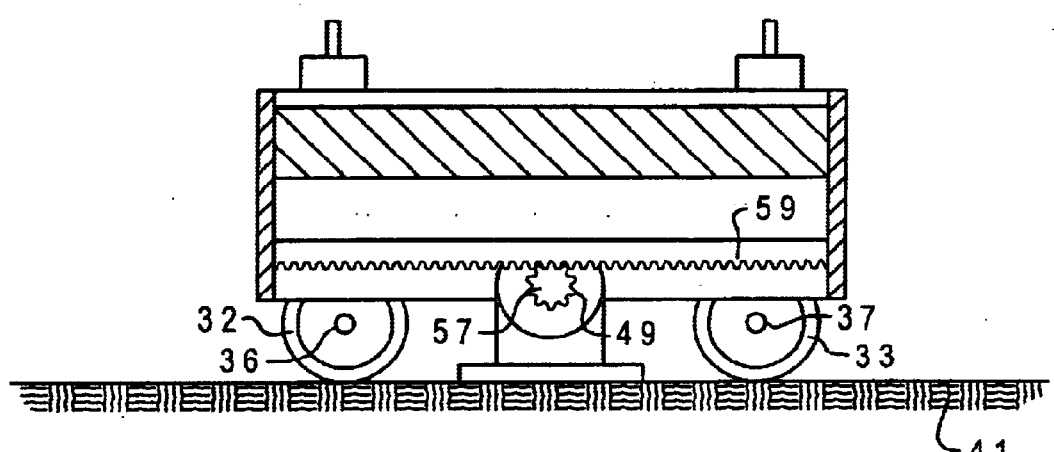
FIG. 6 is a cross section of a portion of the apparatus showing the floor mounted motor and a gear track secured to the lower frame.
Figure 7:
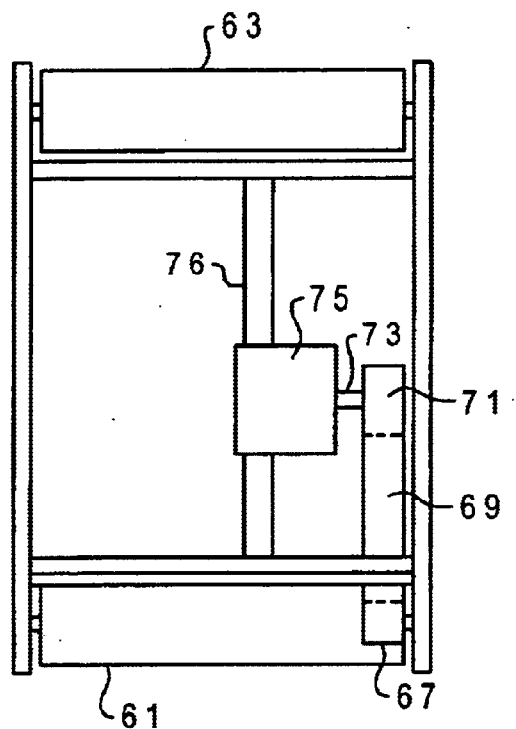
FIG. 7 is a top plan view of the lower frame showing the belt motor.
Figure 8:
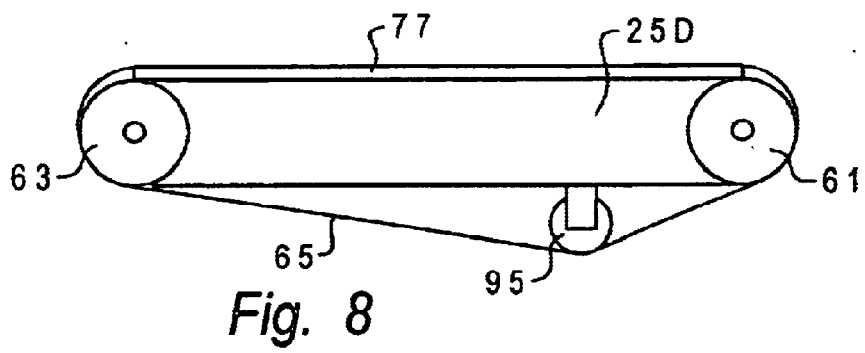
FIG. 8 is a side view of a portion of the apparatus showing the belt and belt tensioning device.

Referring now to FIGS. 1–8 of the drawings, the bag tram of the invention is identified at 21. It comprises a lower rectangular shaped steel frame 23 having four sides 23A, 23B, 23C, 23D and a rectangular shaped upper steel frame 25 having four sides 25A, 25B, 25C, 25D supported by the lower frame. The lower frame 23 has four wheels 31–34 rotatably coupled thereto by axles 35–38, coupled to the frame 23 by supports 40. The wheels support the tram 21 and allows it to move on a floor 41 between a loading position next to a ticket counter 43 and an unloading position next to a take away assembly 44 which may comprise a conveyor belt 47. An electric motor 49 is connected to the floor 41 by a motor mount 53 and a plate 55. The motor 49 drives a gear 57 by way of a clutch 45. The gear 57 meshes with the teeth of an elongated straight track gear 59 connected to the lower frame 23 to move the tram 21 back and forth in a straight line between the two positions. Two cam followers 60 are rotatably mounted to the mount 53 on each side of the track gear 59 to enhance movement of the track 59 and hence of the tram 21 (only two cam followers are shown).

The upper frame 25 rotatably supports two rollers 61 and 63 around which a continuous belt 65 extends. Shafts 61S and 63S are fixedly coupled to the rollers 61 and 63 on each side thereof and are rotatably coupled to the frame 23 to support the rollers for rotation. Roller 61 has a gear 67 coupled to one of its shafts 61S. A continuous drive chain 69 extends around gear 67 through an aperture 70 formed through the frame member 25A and around a gear 71 coupled to the shaft 73 of a motor 75 such that the motor 75 can rotate the roller 61 and hence the belt 65. The motor 75 is connected to the frame 25 by brackets 76. A flat steel plate 77 is connected to the upper edges of the frame 25. The belt 65 extends next to the upper surface of the plate 77 such that the belt 65 can support luggage placed thereon and move it off of the tram onto the take away assembly when the tram is moved next to the take away assembly 44 and an unload button is pushed and the system determines that unloading can be carried out. Movement of the belt is initiated by a programmable logic controller to be described hereinafter.

The upper frame 25 has two side walls 79 and 81 which are coupled therefor and extend upward from the plate 77 on opposite sides of the belt 65. The walls 79 and 81 comprise outer side panels, inner side panels and end panels and top panels. The front ends 79 A and 81A of the walls 79 and 81 are at right angles relative to the tops and bottoms thereof and the rear ends 79B and 81B define the configuration as shown in FIG. 1. Lights 79BL and 81BL are located on the ends 79B, 81B respectively.

The lower frame 23 has two side panels 83 and 85 and two ends crash plates 87 and 89. Proximity switches 91 and 93 are located behind panels 87 and 89 respectively.

Mounted on the top edge portion of the lower frame, next to each of the four corners are gauge metal carriers or clip angles that hold four commercially available load cells 101–104. These load cells support all loads transmitted from the upper frame. The load cells support four rods 111–114 which extend vertically upward. The load of the upper frame and conveyor assembly is transmitted only through these four rods to the load cells. The load cells determine the weight of the load placed upon the conveyor assembly, transmitted through the upper frame assembly, and through the four rods to the load cells. The upper skin or facade of the tram is attached only to the upper frame of the tram and not to the lower frame. The upper tram assembly floats or rests upon the rods/load cells. The loads cells are zeroed out and recalibrated to compensate for the dead loads of the upper frame and conveyor assembly. The load cells then only weigh and report the live load of a customers bag after it is placed upon the conveyor assembly. The upper frame is machined to receive and hold securely commercially available conveyor parts, specifically known as a slider belt 65 in the conveyor industry. The conveyor assembly holds and eventually unloads all customer bags placed upon it. The customers bag is considered a live load to the tram and the weight will vary from customer to customer. The load cells determine the weight of the customers bag and transmits the weight to an electronic LED readout by way of a multiplier and a load module in a portion of the users control panel 115. The control panel is securely mounted to the lower frame of the tram and by way of a support 117 is elevated to about 48 inches aft for ease of use and convenience by the user. The load cells are approximately 1½ inches wide×3 inches deep×5 inches long. Most airline companies have established predetermined weight limits for customer bags that are checked in at a ticket counter. If the bag weight is in excess of these limits, additional fees are due from the customer. This limit is programmed into a load module 121 and to a programmable logic controller (PLC) 201 as shown in FIG. 9 to be described hereinafter, which receives weight information and distributes the information to the main control panel 115.

Figure 9:
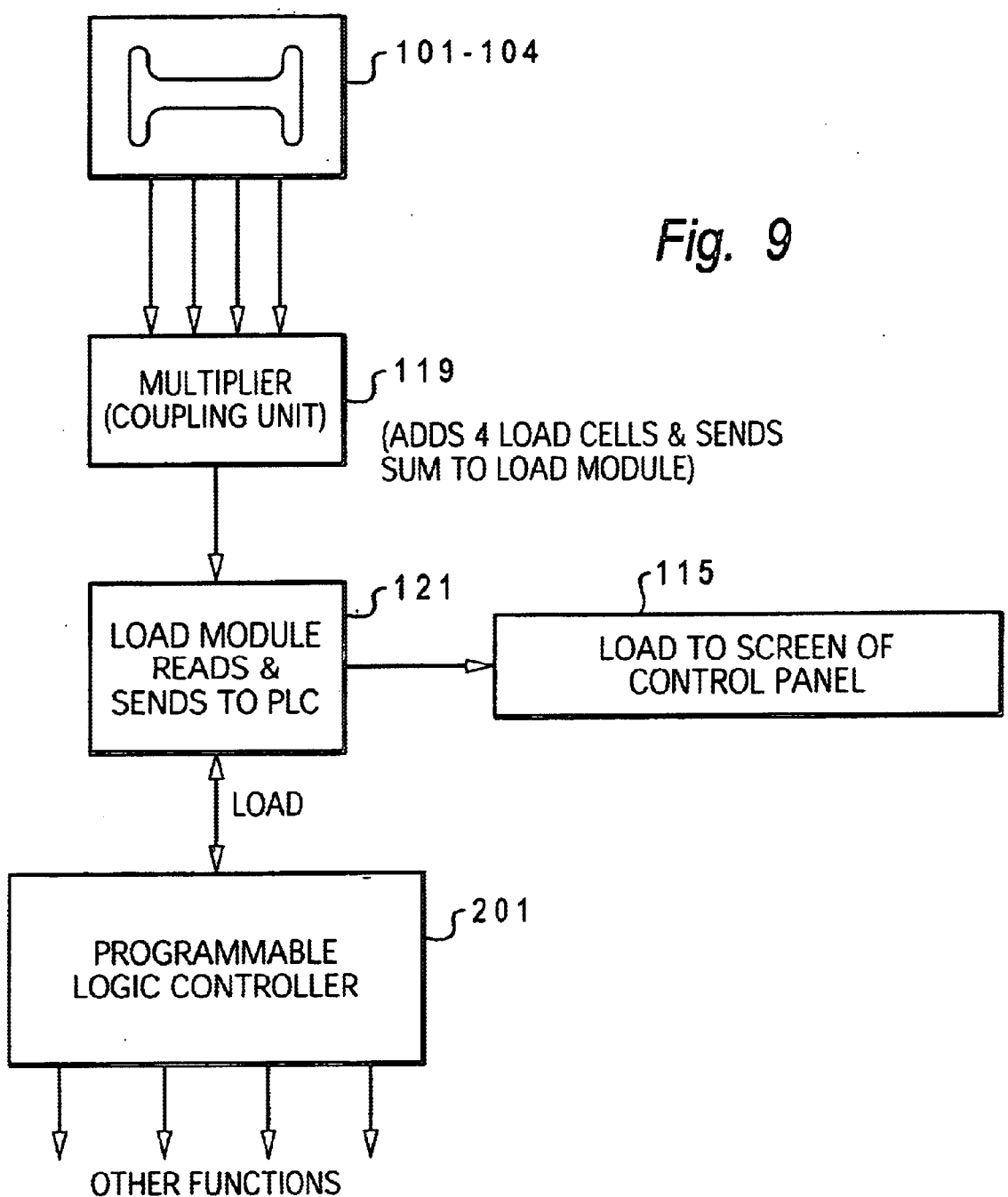
FIG. 9 illustrates the load weighting system.
Figure 10:
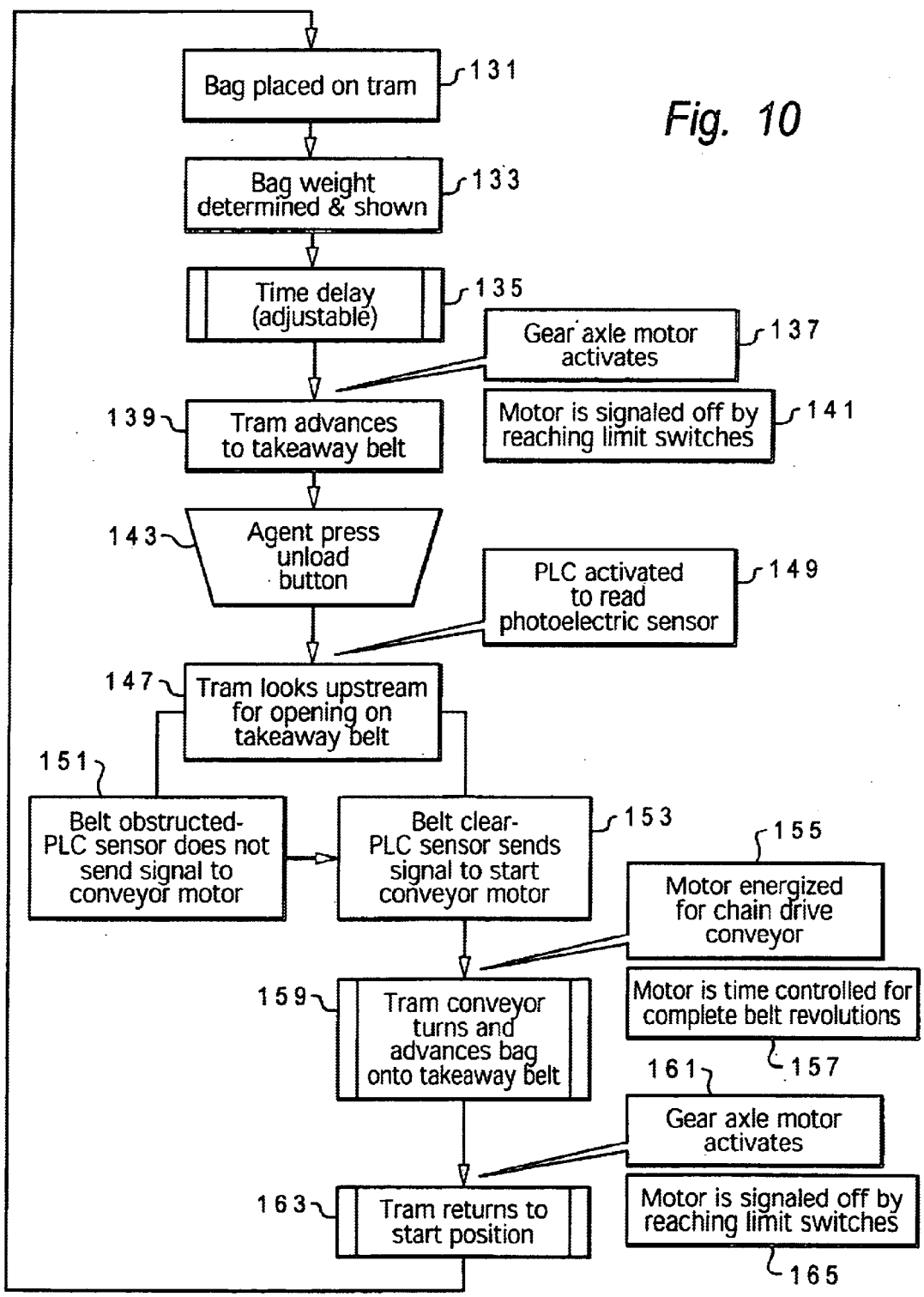
FIG. 10 is a flow diagram of the operation of the system.
Figure 15:
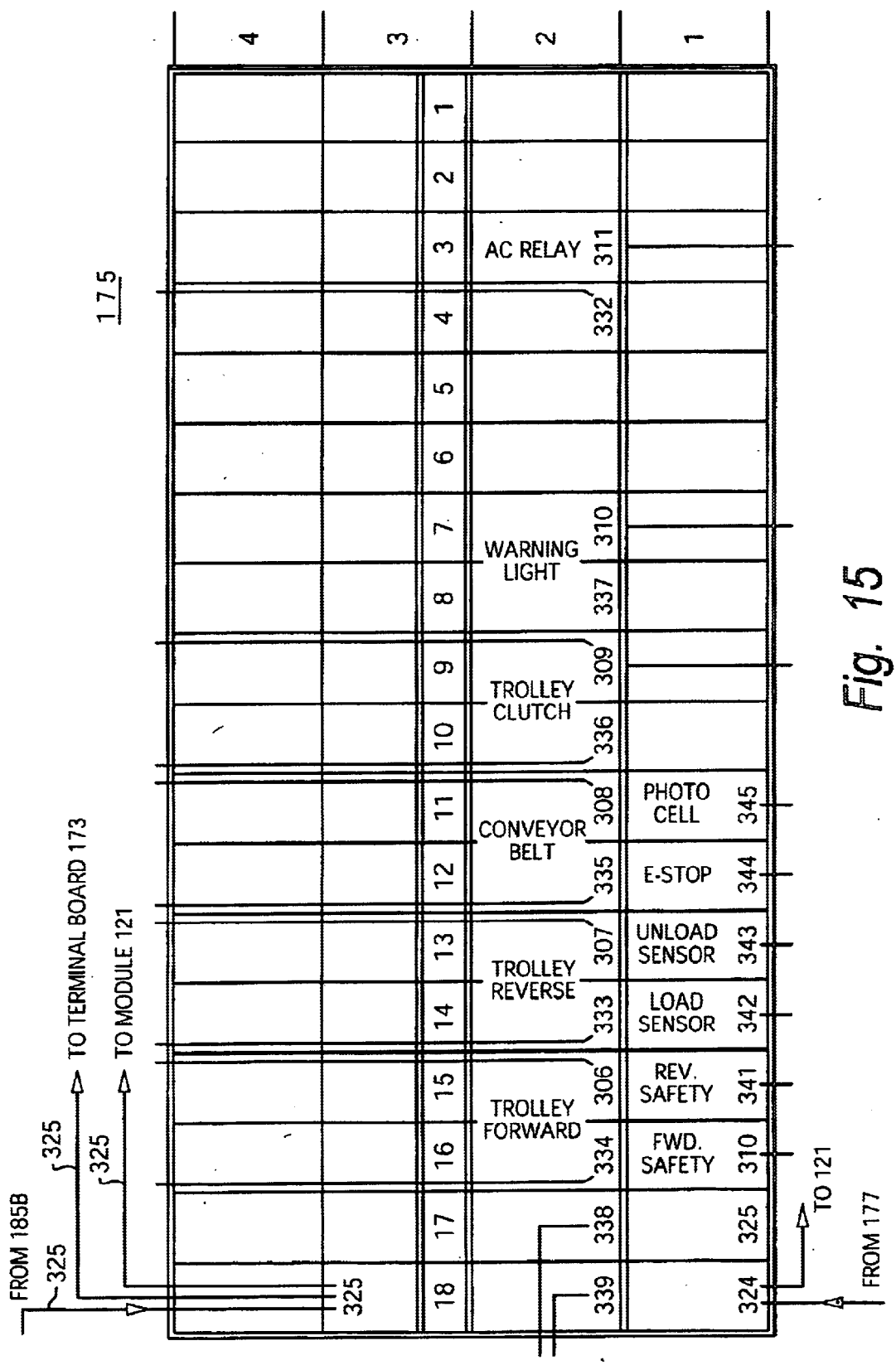
FIG. 15 is a more detailed illustration of a programmable logic controller of the system.

Referring to FIG. 9, the four load cells 101–104 each produce an electrical output which are applied to a summary circuit 119 the output of which is applied to a load module 121. Its output is applied to the control panel 115 and to the PLC 201. The tram is programmed to automatically advance to the take away belt and stop unless the weight limit is exceeded. If the weight limit is exceeded the tram will not advance to the take away belt until the user acknowledges the overweight condition. The user acknowledges the over-weight control location, by hitting a separate "forward" button on the control panel and the tram advances to the take away belt. Upon arrival at the take away belt, the tram is ready for the user to "tag" the customers bag with the usual label that is placed on a travelers bag by a ticket agent. The tag shows typical information about flight information, destinations, flight numbers, etc. When the tram stops, the user is trained to place the tag on the customers bag and hit the "unload" button. Upon receiving a signal to "unload" from the control panel, the tram's PLC 175 (see FIGS. 11, 12, 15) is actuated to sense for a reflected signal from a photovoltaic proximity switch 94, from a reflector 94F placed upstream of the take away belt 47 (See FIG. 18). If the signal is reflected back then the system determines that the take away belt is clear and that the customers bag may be unloaded. If the signal is interrupted by an obstruction, usually a bag proceeding down the take away belt, then the tram waits until a clear signal is received before unloading the customer's bag. When the bag is unloaded, the tram automatically returns and is ready for reuse with the next customers bag.

The tram uses proximity switches 91 and 93 installed behind moveable front and rear covers 87 and 89. If contact is made with the front or rear cover then the proximity switch senses contact and sends a "kill" signal through the PLC 175 to the drive motor. The tram instantaneously stops and sends a signal to the control panel. The control panel then visually shows a picture of the tram and a bright red "X" on either the front or rear of the tram. This signal is used to visually show the user which sensor is in alarm and which end of the tram has been obstructed. After the obstruction is removed from the tram's path of travel, the user must push a "reset" button. After receiving the "reset" signal, the user pushes the forward or reverse button on the panel 115 and the tram will continue on to the unload or home position.

The tram's electronic parts are installed into a sliding drawer assembly 119 (see FIG. 5) into the end of the tram. A removable cover can be removed and the drawer (installed with drawer glides) can easily be opened for access to all electronic parts. Two PLC's and electrical relays along with a 24 volt power supply are installed inside the drawer. The four AC to DC converters also are located in the drawer 119. The drawer is positioned to move with the tram and clear the drive motor that is mounted to the floor.

The lower frame also includes minor steel framing members used to hold fasteners for supporting skin elements. Additional framing is used for mounting proximity sensors, that work with the outer skin elements that detect obstacles in the tram path of motion. the sensors report a trouble signal to the control panel. The PLC 175 that receives and sends this signal also sends a signal instantaneously to stop the motor. When the drive motor stops, there is approximately ½ inch drift.

The outer skin is designed to move backwards to near its support member and spring back into place when there is no pressure against it much as the "crashbar" on an exit device for a fire rated door.

The upper frame also includes minor steel framing to support the conveyor motor and a belt-tightening roller 95B as is standard with conveying equipment. The vulcanized belt is continuous by industry standard. The belt is 24 inches wide×⅝₁₆ inches thick and continuous longitudinally across the top of the tram. The upper frame also supports the upper skin elements, which are kept separate from the lower skin elements. This is necessary to properly transmit the dead and live loads of the upper assembly to the load cells only, and through the load cells to the lower frame and wheels etc.

The tram uses 2 DC gear motors (2.3 full load amps each, but only one at a time), a 24 volt power supply (1.5 full load amps), 2 PLC 201 controllers (1.2 full load amps total), one "touch screen" PLC (1.0 full load amps) and an electric clutch used to disengage the drive motor upon safety sensor activation. The total full load draw is approximately 8.3 amps.

Referring now to FIGS. 10–15, there will be described the operation of the system of the invention. At 131, a bag is placed on the tram 21. The bag weight is determined and shown at 133. The system has an adjustable time delay at 135 after which at 137 the motor 49 is actuated and at 139 the tram 21 advances to the take away belt 47. When the tram 21 reaches the take away belt, at 141 the motor is signaled off by upon reaching a fixed contact which opens a limit switch 189. At 143 the agent presses the unload button. At 147 the photoelectric sensor 94 looks upstream for an opening on the take away belt 47. As indicated at 149, the PLC then reads the sensor 94. At 151 if the take away belt is obstructed, the PLC does not send a signal to the conveyor motor. At 153, if the belt is clear, the PLC sends a signal to start the conveyor motor 75. The motor 75 is energized for operating the chain drive conveyor as indicated at 155. As indicated at 157, the motor 75 is time controlled for complete belt revolutions. As indicated at 159 the tram 21 conveyor turns and advances the bag onto the take away belt. As indicated at 161 and 163, the motor 49 is activated and the tram 21 returns to the start position and at 165 the motor 49 is signaled off by reaching a fixed contact which opens the limit switch 187.

Referring now to FIGS. 11–16, the control system will be described. The system comprises a 110 AC power source 171, a terminal board 173, five relays 1CR, 2CR, 3CR, 4CR, 5CR, a programmable logic controller (PLC) 175, the weighing module 121, a fuse box 177, a 110 volt AC to 90 volts DC converter 179A, 179B for operating the tram 21 motor 49, a 110 volt AC to 90 volt DC converter 181A, 181B for operating the conveyor motor 75, a 110 volt AC to 90 volt DC converter 183A, 183B for operating the coil 45C of the clutch 45 of the motor 45; and a 110 volt AC-24 volt DC converter 185A, 185B for producing 24 volts DC. Also provided are the tram lights 79BL, 81BL, the panel monitor 115, the photocell 94, switches comprising a home stop switch 187, a forward stop switch 189, a forward safety switch 91, a reverse safety switch 93, and an emergency switch 195. The 24 volts DC is used to operate the weighing module 121, the PLC 175, the lights 79BL and 81BL, the photocell 94, the monitor 115, and the switches 187, 189, 91, 93, and 195. Switches 187 and 189 normally are closed and switches 91 and 93 normally are open. The PLC 175 employs the 24 volts DC to energize the relay coils 1CR, 2CR, 3CR, 4CR, 5CR at the desired times.

Figure 11:
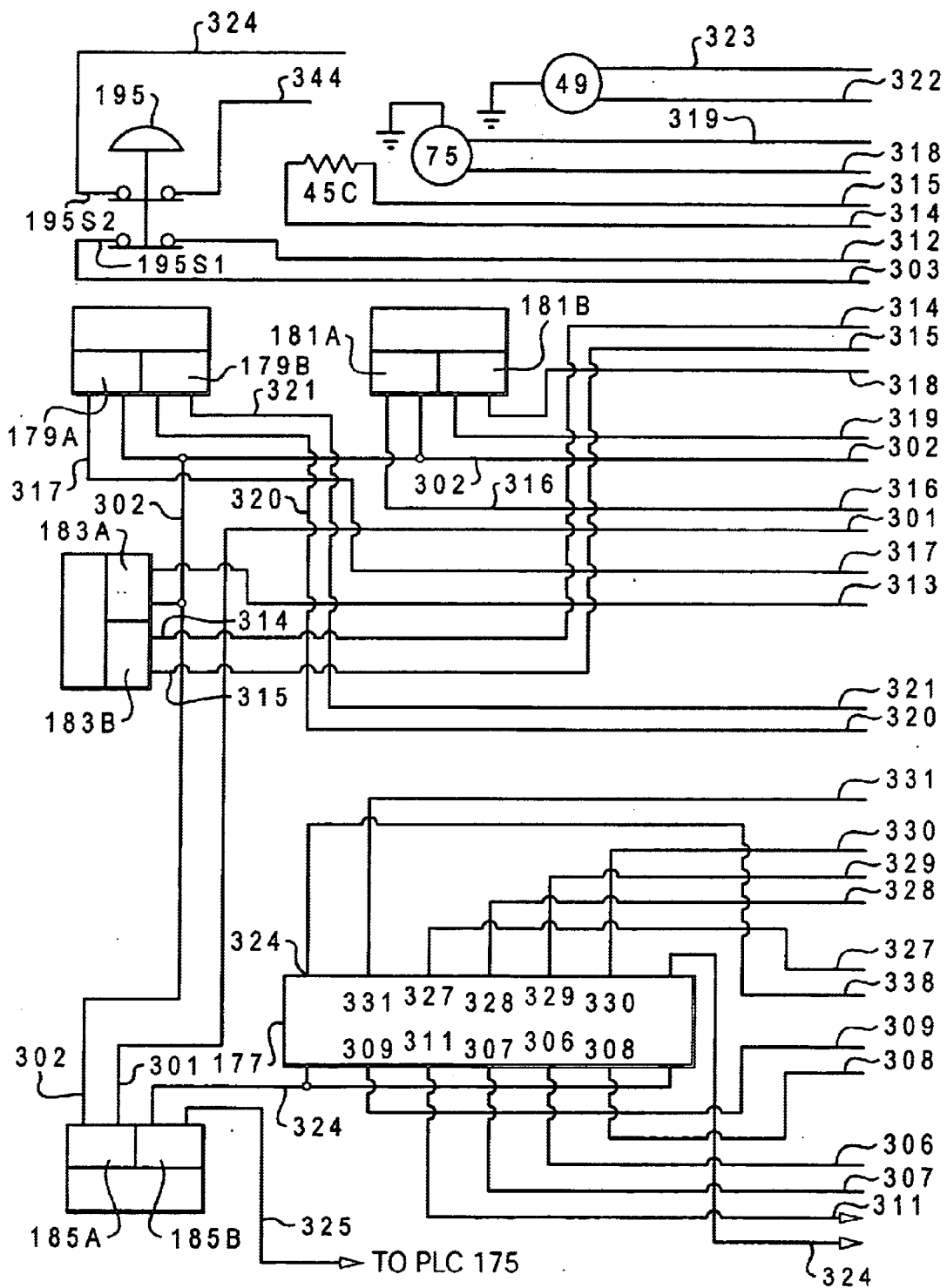
FIGS. 11 and 12 are electrical schematics of the electrical system.
Figure 12:
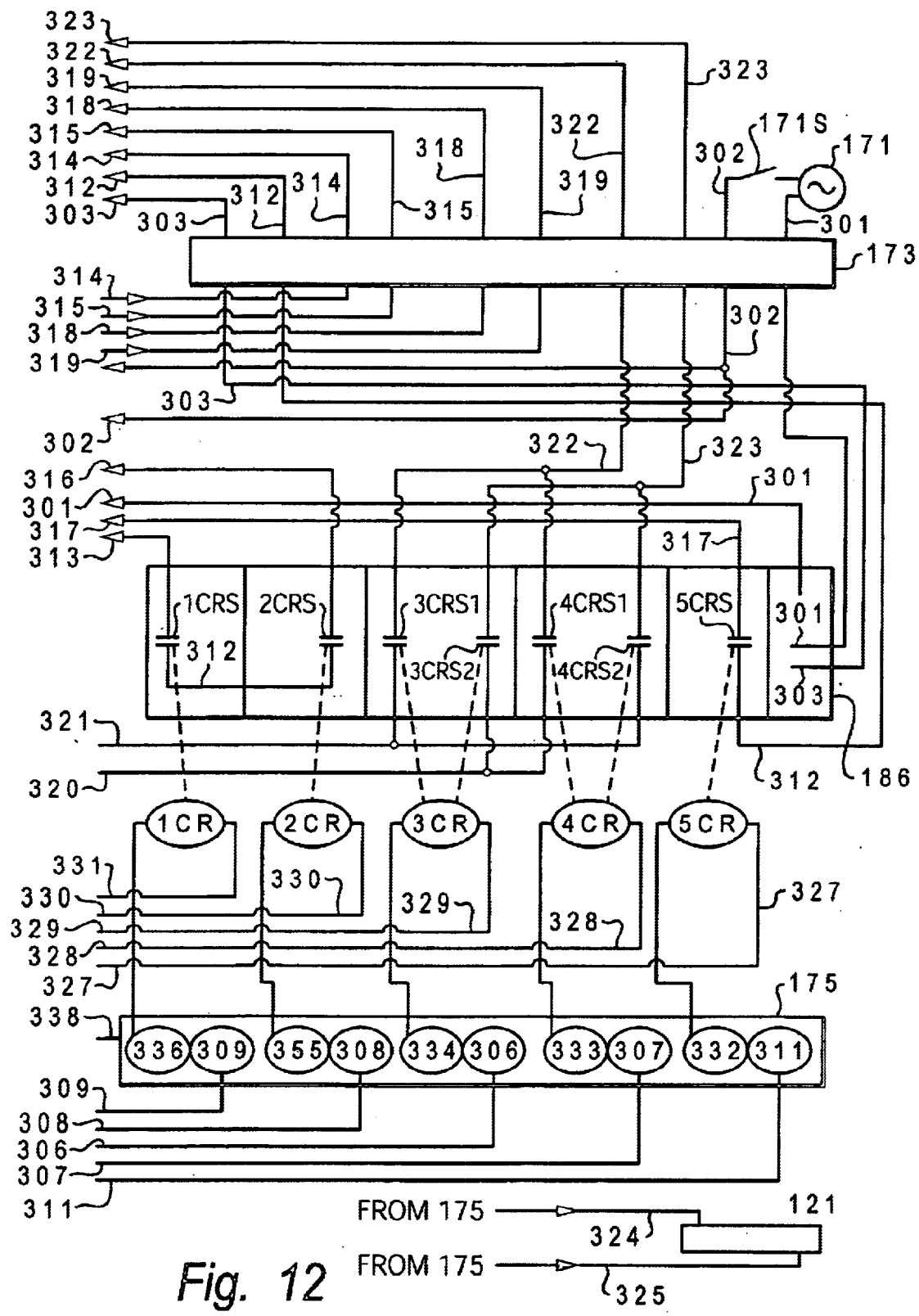

Referring to FIGS. 11 and 12, there will be described the operation of the relays 5CR, 4CR and 1CR. When 110 volts AC is applied from source 171 either by closing switch 117S or by direct connection of the leads 301 and 302 to the source 117, a path is connected to the AC to DC converters 179A–179B, 181A–181B, 185A–185B. The path from lead 302 goes through the terminal board 173 to unit 179A, to unit, 181A to unit, 183A and to unit 185A. A return path is applied from unit 185A by way of lead 301 to the 301 connection at the breaker 186 and from 186 to the terminal board 173 to the AC source 171. Thus 24 volts DC is applied to the fuse box 177, the PLC 175 and the monitor 115. Note FIGS. 13, 14, 15. The 24 volts DC applied to the PLC 175 is used to operate the lights 79BL and 81BL, and the photocell 94, the weighing device 121. The PLC 175 employs the 24 volts DC to energize the relays 1CR, 2CR, 3CR, 4CR, 5CR at the desired time. (At this point in time AC returns leads from units 179B, 181A, 183A are not connected).

The PLC 175 is timed to control the various devices. After a bag on the conveyor belt 65 is weighed and acknowledged, the PLC 175 energizes relay coil 5CR which closes its switch 5CRS and completes the circuit to the AC-DC converter 179A by way of lead 317. This results in 90 volts DC being produced by unit 179B. The PLC also energizes relay coil 4CR which closes its switches 4CRS1 and 4CRS2 which applies 90 volts DC from unit 179B to the trolley motor 49. In addition, the PLC energizes relay coil 1CR (simultaneously when coil 5CR is energized) which closes its switch 1CRS which applies 90 volts DC from unit 183B to the clutch coil 45C.

In a more detailed description, the PLC 175 makes connection internally with 332 and 311 which completes a circuit by way of lead 311, fuse box 177 and lead 327 to the coil 5CR. The PLC applies DC voltage to the coil 5CR which closes switch 5CRS. Lead 312 is connected by way of the terminal board 173 to normally closed switch 195S1 to lead 303 which is connected to terminal 301 of the breaker 186 which in turn is connected to lead 301 of the source 171 by way of the terminal strip 173. Thus 110 volts AC is applied to lead 317 from closed switch 5CRS to the AC converter 179A. This produces 90 volts DC to leads 320 and 321. The PLC 175 also energizes relay coil 4CR by connecting leads 333 and 307. Lead 333 is connected to one side of 4CR. Lead 307 is connected through the fuse box 177 to lead 328 which is connected to the other side of the coil 4CR.

From unit 179B leads 320 and 321 are connected to the lower leads 320 and 321 of switches 4CRS1 and 4CRS2. Switches 4CRS1 and 4CRS2 also are connected to leads 322 and 323 respectively which in turn are connected to the trolley motor 49.

The PLC closes its contacts 336–309 which completes a circuit to relay coil 1CR by way of the fuse box 177 and energizes relay coil 1CR which closes its switch 1CRS. Lead 312 below switch 1CRS is connected to 110 volts AC as mentioned previously. The upper end of switch 1CRS is connected to lead 313 which is connected to lead 313 of unit 183A and hence completes a 110 volt circuit to unit 183A which results in 90 volts DC being produced by unit 183B. 90 volts DC then is applied by leads 314 and 315 through the terminal board 173 to the clutch coil 45C. Thus after bags have been loaded on the belt and weighed, the trolley moves toward the take away belt 65. At the take away belt, sensor switch 189 is opened by a fixed contact member and the tram 21 stops. The lead 343 is coupled to the PLC 175 by way of terminal board 173 (see FIGS. 13 and 15) and causes the PLC to disconnect leads 333 and 307 which de-energizes relay coil 4CR. This opens switches 4CRS1 and 4CRS2 which removes current from the motor 49. The clutch 45C remains energized as does the AC to DC converter 185A–185B. When the system initially is turned on, the photocell 94 is turned on by way of a 24 volts DC applied by way of leads 324 and 345 and remains on. See FIGS. 13 and 15. The agent then presses an unload button and the PLC is actuated to read whether the photocell sees a reflection. If a return reflection is sensed by the photocell, the belt is clear and after a given time delay the PLC 175 energizes relay coil 2CR by closing its contacts 355, 308, which closes switch 2CRS. When switch 2CRS is closed, 110 volts AC is applied from lead 312 to lead 316 which is coupled to the 110 AC unit 181A. 90 volts DC is produced by unit 181B which is applied by way of leads 318 and 319 and terminal block 173 to the conveyor motor 75. The motor 75 is time controlled by the PLC 175 to complete whole revolutions of the tram 21 conveyor belt to unload the baggage on to the take away conveyor, after which the motor 75 is stopped by the PLC 175 opening its contacts 335 and 308 de-energizing the relay 2CR stopping the conveyor belt 65.

The PLC 175 then energizes relay coil 3CR by closing contacts 334, 306 to close switches 3CRS1 and 3CRS2. This reverses the connection of leads 321 and 320 to leads 322 and 323 to the motor 49 and causes it to return the tram 21 back to its home base. At home base the limit switch 187 is opened by a fixed contact member coupled to the motor stand 55. The PLC 175 senses when switch 187 is opened and de-energizes relay coils 3CR and 5CR by opening its contacts 334–306, and 332–311. When the next baggage is weighed by the system, and acknowledged, the tram 21 again moves to the take away belt for unloading purposes.

Referring also to FIG. 16, more detail of the system and its operation will be described. The control panel 115, the module 201 and the PLC 175 all have built in logic systems. The control panel 115 has a touch screen with five buttons and a display for lights on the tram. The five buttons are unload, forward, rearward, reset, and zero. The zero button is used to zero out the weight of the upper frame and belt the obtain the true weight of the bags on the tram. Electrical cables 401, 403, 405 are coupled between the units 115, 175, 201 to allow communication between the connected units in both directions as shown by the arrows.

There will be described several scenarios in the operation of the system. Assume that bags have been loaded on the tram. The weight is displayed on the screen 115. If the weight is within the limits, the PLC 175 will wait for a given time and then actuate the trolley motor 49 and connect the clutch 45 to the gear 57 to move the tram forward to the take away belt 47. When the tram 21 reaches a given position, a fixed contact on the motor stand 53 will open the switch 189 and cause the tram to stop. There also is a mechanical stop at the take away belt to stop the tram if the electrical system does not operate properly. The operator then will tag the bags and if there are no bags upstream on the take away belt, the operator will push the unload switch on the panel 115. The PLC 175 then will actuate the belt motor 75 to turn the belt 65 to move the baggage on the belt 65 onto the take away belt. After a given waiting period the PLC will signal the motor 49 to return back to the loading position at which point a fixed contact on the motor stand 53 will open the home switch 187 and the PLC 175 will stop the motor 49. There also is a mechanical stop at the home position which will engage the tram frame if it is not stopped by opening of the switch 187.

Assume now that a bag has been placed on the tram when at the home position for weighing purposes and the bag has a weight over the maximum limit. The system will do nothing at this point. The operator will charge for the overweight and then push the forward button and the PLC 175 will signal the tram to move forward to the unload position by activating the motor 49 and clutch 45C. At the unload position the tram stops by the limit switch 189 engaging the fixed contact as mentioned above. After the unload button is pushed assume that a bag upstream is on the take away belt. The photocell will not receive a reflected signal and the belt motor 75 will remain off. When the belt 47 is clear, and a reflected signal is sensed by the photocell 94 and hence by the PLC 175, the PLC 175 will wait a period of time and then send a signal to the belt motor 75 to turn the belt 65 to unload the bags onto the take away belt.

There are lights 79BL and 81BL on the rear end of the tram 21. They are on only when the tram 21 is moving. There also are proximity switches 91 and 93 on each end of the tram behind the panels 87 and 89. If the tram hits a bag in its path in moving either to the forward or reverse positions the switch 91 or 93 will be closed which will send a signal by either of leads 340 or 341 to the PLC 175 which in turn will de-energize either the relay coil 4CR or 3CR to stop the motor 49 to stop the tram. The panel 115 will display which end of the tram hits the bag. After the bag has been removed from the tram path, the operator then will push the reset switch on the panel 115 and then the forward or reverse button on the panel 115 and the tram will continue on to the unload or home position.

The E-stop switch 195 is a safety switch which is connected through the terminal block 173 to lead 312 of the relays 5CR and 1CR and to lead 344 of the PLC 175 and stops the motor 49 and the motor 75 to shut down the system when the contacts of the switch 195 are opened. The two switches of the E-stop switch 195 normally are closed.

The clutch 45 is located between the motor 49 and its gear 57. If the tram 21 hits an object in its path, the E-stop switch 195 is pushed, or electrical power goes off, the PLC 175 disengages the gear 57 from the motor 49 by inactivating the clutch 45 whereby the tram 21 can be pushed out of the way.

In one embodiment, the PLC 175, weight module 121, and panel 115 may be of the type commercially available from Square D Corp. and identified as model numbers 170ADM37010, 1701SP00200, and XBTFL022310, respectively. The PLC 201 is commercially available from Square D Corp. and is similar to PLC 175. The dimensions W, H, and L may be of the order of 24 inches, 30 inches, and 45 inches respectively.

The limit switches 187 and 189 and the photoelectric device 94 are located on the tram 21 and move with the tram. Two switch opening contact members are connected to the mount of the motor 49 which opens the switches 187 and 189 when these switches on the tram reach these contact members respectively to stop movement of the tram. The sensor 94 is a photoelectric device but it could be a laser, a sonar device, etc. that can project a beam to the reflector 94F and detect a reflected beam that can be sensed by the PLC 175 when the take away belt 47 is clear.

Figure 19:
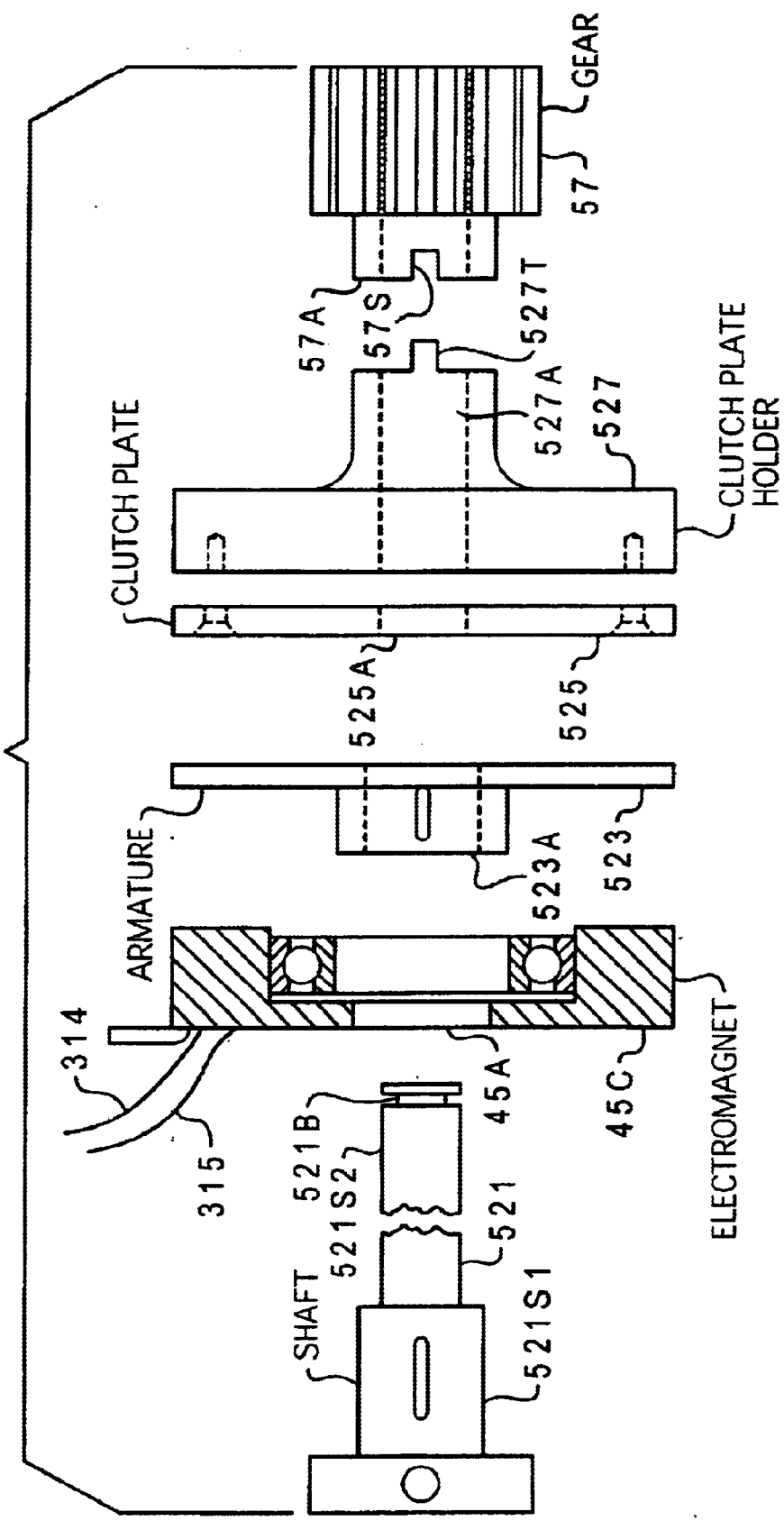
FIG. 19 is an exploded view of the clutch of the system.

Referring now to FIG. 19, the clutch 45 is an electromagnetic clutch. It comprises a shaft 521 fixedly coupled to the shaft of the motor 49; an electromagnet 45C comprising an electrical coil; an armature 523, a clutch plate 525; and a plate holder 527. The gear 57 engages the track gear 59. The electromagnet 45C is fixedly coupled to the motor stand 53 and does not rotate. The shaft 521 extends through apertures 45A, 523A, 525A, 527A of members 45C, 523, 525, 527 and through an aperture 57A of the gear 57 such that the shaft slot 521B extends beyond the gear 57 with a washer located in the slot 521B. The large diameter portion 521S1 of the shaft 521 is located in apertures 45A, 523A, and the small diameter portion 521S2 is located in apertures 525A, 527AS, and 57A. The clutch plate 525 is fixedly coupled to the plate holder 527. When the motor 49 and hence the shaft 521 rotates, the shaft portion 521S1 rotates within the aperture 45A of the electromagnet 45C and is fixedly connected to the armature 523 such that the armature 523 always rotates with the shaft 521. When the shaft 521 rotates and when electrical power is disconnected from the electromagnet 45C, members 525, 527 and 57 remain stationary and the shaft portion 521S2 rotates within the clutch plate 525, the clutch plate holder 527, and within the gear 57 such that the shaft of the motor 49 effectively is disconnected from the gear 57. The shaft of the motor 49 also is disconnected from the gear 57 when electrical power is disconnected from the electromagnet 45C and the shaft 421 does not rotate such that the tram 21 can be moved manually.

A plurality of tabs 527T extend from the holder 527 and a plurality of slots 57S are formed in the shaft of the gear 57. Tabs 527T and slots 57S mate such that the clutch plate 525, clutch plate holder 527 and gear 57 rotate together when the shaft 521 rotates and when electrical power is applied to the electromagnet 45C. When electrical power is applied to the electromagnet 45C, the magnetic force pulls the clutch plate 525 and plate holder 527 against the armature 523 such that the clutch plate 525 and clutch plate holder 527 and hence the gear 57 by way of tabs 527T and slots 57S rotate together with the motor shaft, shaft 521 and armature 523.

Figure 13:
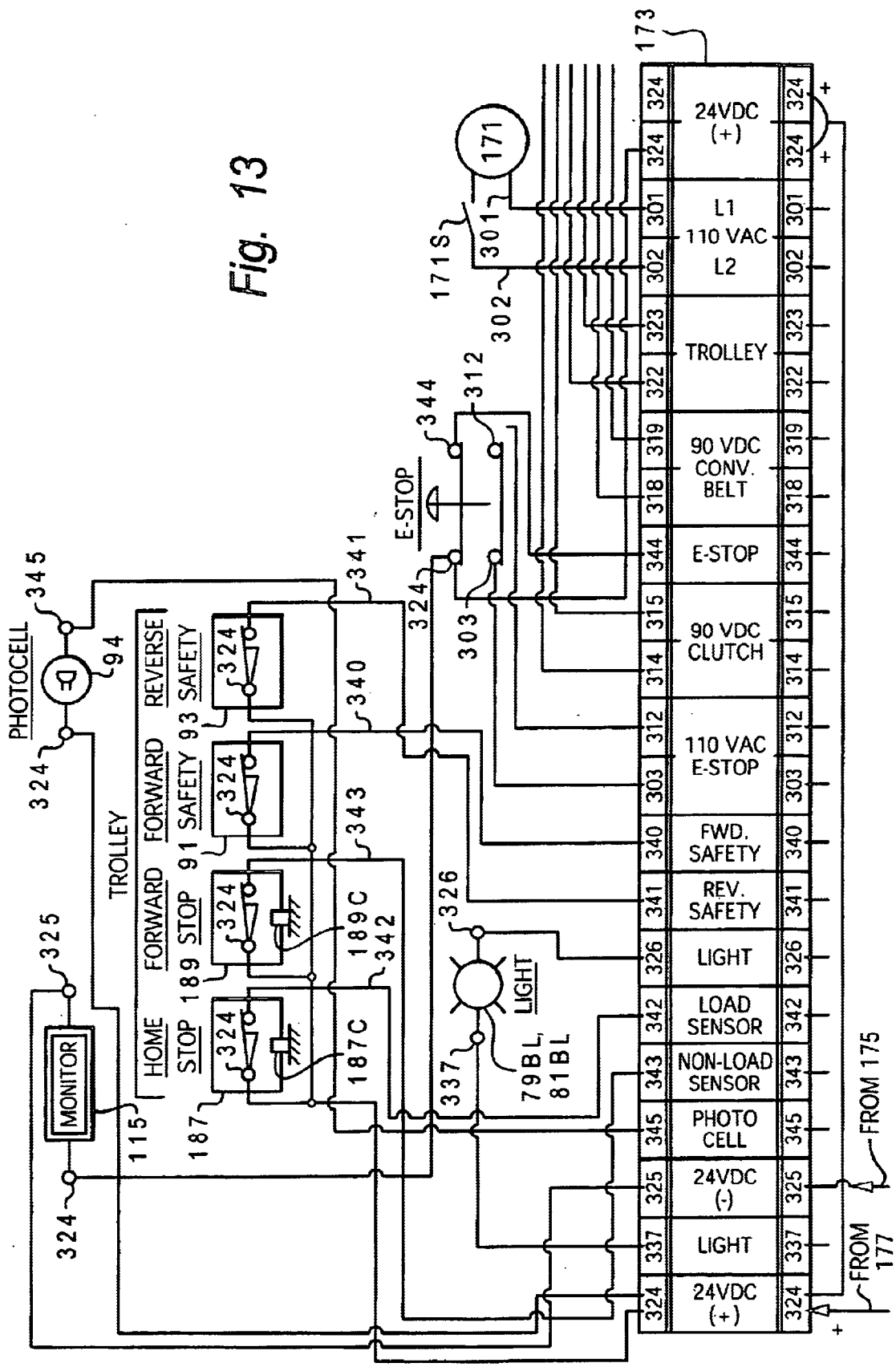
FIG. 13 is a more detailed illustration of the terminal board and switches, and other electrical components of the system.
Figure 14:
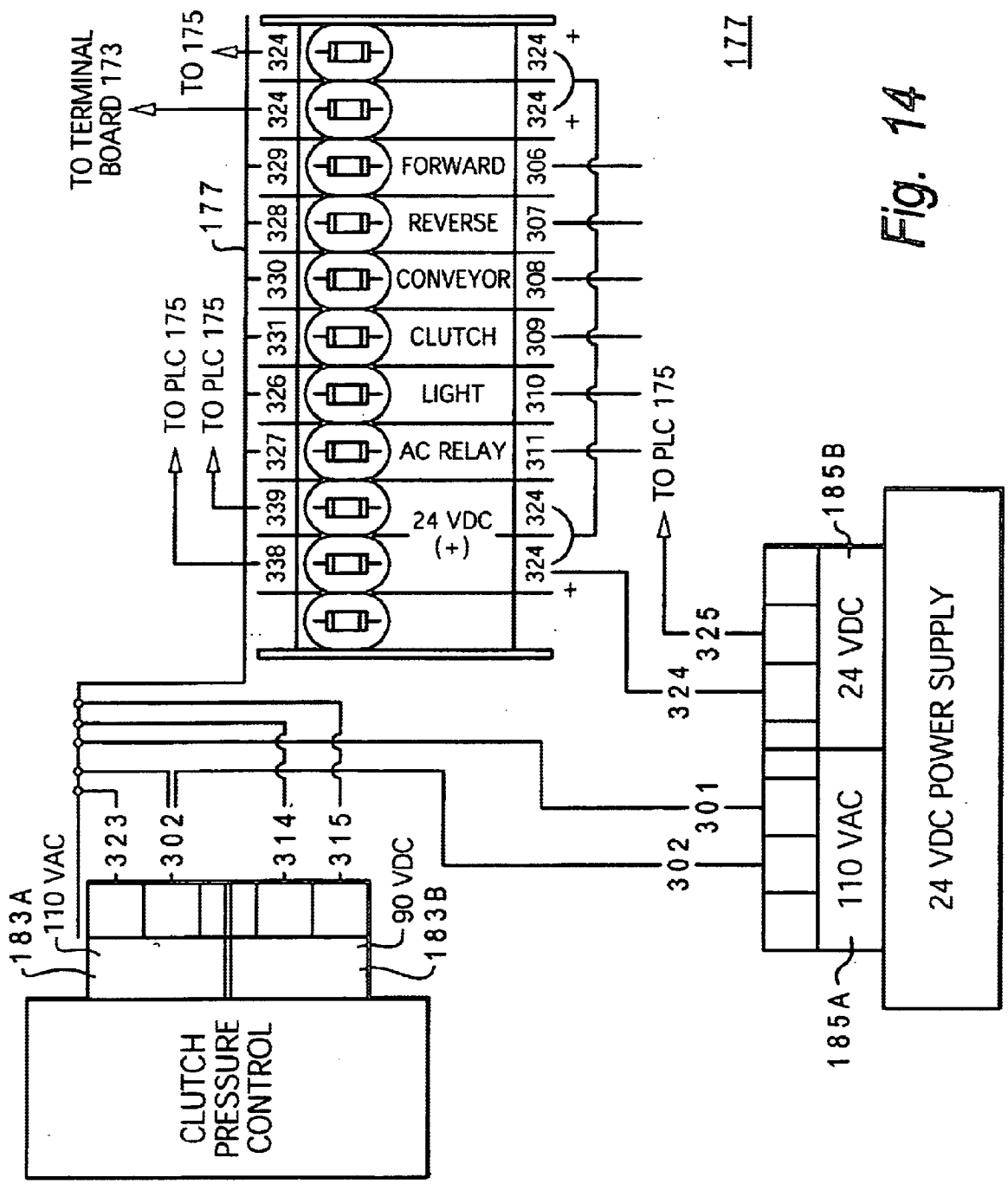
FIG. 14 is a more detailed illustration of the fuse box of the system.

In FIG. 13, the fixed contact members for opening switches 187 and 189 are illustrated at 187C and 189C respectively. The switches 187 and 189 are located on the tram and members 187C and 189C are located on the motor stand 53. The switches 187 and 189 move toward members 187C and 189C respectively when the tram moves to the home and unloading positions respectively and will be opened by these members for stopping the tram at the home and unloading positions.

What is claimed is:

1. Apparatus for transferring baggage from a loading position to an unloading position spaced from said loading position, comprising:

a lower frame, an upper frame coupled to said lower frame and located above said lower frame, wheels coupled to said lower frame for engagement with a base for movably supporting said lower and upper frames on the base, a conveyor belt supported by said upper frame for supporting and moving baggage placed on said belt, load sensing means coupled to said lower frame for supporting said upper frame above said lower frame for use for determining the weight of baggage placed on said belt, frame drive means connected to both of said lower frame and to said base for moving said frames between said loading and unloading positions, belt drive means for moving said belt and hence baggage supported by said belt off of said apparatus when said frames are located at said unloading position.

2. The apparatus of claim 1, wherein:

said base comprises a stationary floor base, said frame drive means comprises a motor coupled to and supported by said stationary floor base such that said frames are movable between said loading and unloading positions relative to said motor.

3. The apparatus of claim 2, comprising:

gear means coupled to said lower frame and, a rotatable gear coupled to said motor for driving said gear means and hence for moving said frames.

4. The apparatus of claim 1, comprising;

control means for controlling said frame drive means for moving said frames from said loading position to said unloading position and from said unloading position to said loading position.

5. The apparatus of claim 4, wherein:

said base comprises a stationary floor base, said frame drive means comprises a frame motor coupled to and supported by said stationary floor base such that said frames are movable between said loading and unloading positions relative to said frame motor, said belt drive means comprises a motor coupled to said belt.

6. The apparatus of claim 5, comprising;

gear means coupled to said lower frame and, a rotatable gear coupled to said frame motor for driving said gear means and hence for moving said frames.

7. The apparatus of claim 1, wherein:

said load sensing means supports said upper frame for movement relative to said lower frame for producing an output which reflects the weight of the baggage placed on said belt.

8. Apparatus for transferring baggage from a loading position to an unloading position spaced from said loading position, comprising:

a lower frame, an upper frame coupled to said lower frame and located above said lower frame, wheels coupled to said lower frame for engagement with a base for movably supporting said lower and upper frames on the base, a conveyor belt supported by said upper frame for supporting and moving baggage placed on said belt, load sensing means coupled to said lower frame for supporting said upper frame above said lower frame for use for determining the weight of baggage placed on said belt, frame drive means coupled to said lower frame for moving said frames between said loading and unloading positions, belt drive means for moving said belt and hence baggage supported by said belt off of said apparatus onto a baggage transport means when said frames are located at said unloading position and when said belt drive means is actuated, sensor means coupled to said apparatus for sensing for the presence of items on said baggage transport means moving toward said apparatus when said upper and lower frames are at said unloading position and for actuating said belt drive means for unloading baggage onto said baggage transport means if no items are sensed by said sensor means.

9. Apparatus for transferring baggage from a loading position to an unloading position spaced from said loading position, comprising:

a lower frame, an upper frame coupled to said lower frame and located above said lower frame, wheels coupled to said lower frame for engagement with a base for movably supporting said lower and upper frames on the base, a conveyor belt supported by said upper frame for supporting and moving baggage placed on said belt, load sensing means coupled to said lower frame for supporting said upper frame above said lower frame for use for determining the weight of baggage placed on said belt, frame drive means coupled to said lower frame for moving said frames between said loading and unloading positions, belt drive means for moving said belt and hence baggage supported by said belt off of said apparatus when said frames are located at said unloading position, said frame drive means comprises an electrically actuated drive motor, gear means coupled to said lower frame, a rotatable gear coupled to said drive motor, said belt drive means comprises an electrically actuated belt motor, control means for applying electrical voltage to said drive motor for moving said frames from said loading position to said to said unloading position, means for disconnecting electrical voltage from said drive motor at said unloading position to stop movement of said frames, said control means actuates said electrically actuated belt motor at said unloading position to move said conveyor belt to unload baggage from said belt, said control means actuates said drive motor to move said frames from said unloading position to said loading position, and means for disconnecting electrical voltage from said drive motor at said loading position to stop movement of said frames.

10. The apparatus of claim 1, wherein:

said frame drive means comprises first and second drive means which engage each other for moving said frames between said loading and unloading positions, said first drive means being coupled to said base and said second drive means being coupled to said lower frame for movement with said lower frame relative to said first drive means.

11. The apparatus of claim 1, wherein:

said frame drive means moves said frames along a given path which extends between said loading and unloading positions, said belt drive means moves said belt such that said belt moves in line with said given path.

12. The apparatus of claim 10, wherein:

said frame drive means moves said frames along a given path which extends between said loading and unloading positions, said belt drive means moves said belt such that said belt moves in line with said given path.

13. Apparatus for transferring baggage from a loading position to an unloading position spaced from said loading position, comprising:

a frame means, wheels coupled to said frame means for engagement with a base for movably supporting said frame means on the base, a conveyor belt supported by said upper frame means for supporting and moving baggage placed on said belt, load sensing means coupled to said frame means for determining the weight of baggage placed on said belt, frame drive means for moving said frame means between said loading and unloading positions, belt drive means for moving said belt and hence baggage supported by said belt off of said apparatus onto a baggage transport means when said frame means is located at said unloading position and when said belt drive means is actuated, sensor means coupled to said apparatus for sensing for the presence of items on said baggage transport means moving toward said apparatus when said frame means is at said unloading position and for actuating said belt drive means for unloading baggage onto the baggage transport means if no items are sensed by said sensor means.

14. Apparatus for transferring baggage from a loading position to an unloading position spaced from said loading position, comprising:

a frame means, means coupled to said frame means for engagement with a base for movably supporting said frame means on the base, a conveyor belt supported by said frame means for supporting and moving baggage placed on said belt, load sensing means coupled to said frame means for determining the weight of baggage placed on said belt, frame drive means for moving said frame means between said loading and unloading positions, belt drive means for moving said belt and hence baggage supported by said belt off of said apparatus when said frame means is located at said unloading position, said frame drive means comprises an electrically actuated drive motor, said belt drive means comprises an electrically actuated belt motor, control means for applying electrical voltage to said drive motor for moving said frame means from said loading position to said unloading position, means for disconnecting electrical voltage from said drive motor at said unloading position to stop movement of said frame means, said control means actuates said electrically actuated belt motor at said unloading position to move said conveyor belt to unload baggage from said belt, said control means actuates said drive motor to move said frame means from said unloading position to said loading position, and means for disconnecting electrical voltage from said drive motor at said loading position to stop movement of said frame means.

15. Apparatus for transferring baggage from a loading position to an unloading position spaced from said loading position, comprising:

a lower frame, an upper frame coupled to said lower frame and located above said lower frame, wheels coupled to said lower frame for engagement with a stationary floor base for movably supporting said lower and upper frames on said stationary floor base, a conveyor belt supported by said upper frame for supporting and moving baggage placed on said belt, load sensing means coupled to said lower frame for supporting said upper frame above said lower frame for use for determining the weight of baggage placed on said belt, frame drive means coupled to said lower frame for moving said frames between said loading and unloading positions, belt drive means for moving said belt and hence baggage supported by said belt off of said apparatus when said frames are located at said unloading position, said frame drive means comprises a motor coupled to and supported by said stationary floor base such that said frames are movable between said loading and unloading positions relative to said motor.

16. The apparatus of claim 15, comprising:

gear means coupled to said lower frame, and a rotatable gear coupled to said motor for driving said gear means and hence for moving said frames.

17. The apparatus of claim 15, comprising:

control means for controlling said frame drive means for moving said frames from said loading position to said unloading position and from said unloading position to said loading position.

18. The apparatus of claim 17, wherein:

said belt drive means comprises a motor coupled to said belt.

19. The apparatus of claim 18, comprising:

gear means coupled to said lower frame, and a rotatable gear coupled to said motor of said frame drive means for driving said gear means and hence for moving said frames.

20. The apparatus of claim 15, wherein:

said load sensing means supports said upper frame for movement relative to said lower frame for producing an output which reflects the weight of the baggage placed on said belt.

21. The apparatus of claim 15, wherein:

said belt moves baggage thereon onto a baggage transport means when said frames are located at said unloading position and when said belt drive means is actuated, sensor means coupled to said apparatus for sensing for the presence of items on said baggage transport means moving toward said apparatus when said upper and lower frames are at said unloading position and for actuating said belt drive means for moving baggage onto said baggage transport means if no items are sensed by said sensor means.

22. The apparatus of claim 15, wherein:

said frame drive means comprises an electrically actuated drive motor, gear means coupled to said lower frame, a rotatable gear coupled to said drive motor, said belt drive means comprises an electrically actuated belt motor, control means for applying electrical voltage to said drive motor for moving said frames from said loading position to said to said unloading position, means for disconnecting electrical voltage from said drive motor at said unloading position to stop movement of said frames, said control means actuates said electrically actuated belt motor at said unloading position to move said conveyor belt to unload baggage on said belt, said control means actuates said drive motor to move said frames from said unloading position to said loading position, and means for disconnecting electrical voltage from said drive motor at said loading position to stop movement of said frames.

23. Apparatus for transferring baggage from a loading position to an unloading position spaced from said loading position, comprising:

a frame means, wheels coupled to said frame means for engagement with a stationary floor base for movably supporting said frame means on said stationary floor base, a conveyor belt supported by said frame means for supporting and moving baggage placed on said belt, load sensing means coupled to said frame means for determining the weight of baggage placed on said belt, frame drive means for moving said frame means between said loading and unloading positions, belt drive means for moving said belt and hence baggage supported by said belt off of said apparatus when said frame means is located at said unloading position, said frame drive means comprises a first and second drive means which engage each other for moving said frame means between said loading and unloading positions, said first drive means being connectable to said stationary floor base and said second drive means being coupled to said frame means.

24. The apparatus of claim 23, wherein:

said first drive means is connected to said stationary floor base.

25. The apparatus of claim 23, wherein:

said belt moves baggage thereon onto a movable baggage transport means when said frame means is located at said unloading position and when said belt drive means is actuated, sensor means coupled to said apparatus for sensing for the presence of items on said baggage transport means moving toward said apparatus when said frame means is at said unloading position and for actuating said belt drive means for unloading baggage onto the baggage transport means if no items are sensed by said sensor means.

26. Apparatus for transferring baggage from a loading position to an unloading position spaced from said loading position, comprising:

a frame means, means coupled to said frame means for engagement with a base for movably supporting said frame means on the base, a conveyor belt supported by said frame means for supporting and moving baggage placed on said belt, load sensing means coupled to said frame means for determining the weight of baggage placed on said belt, frame drive means for moving said frame means between said loading and unloading positions, belt drive means for moving said belt and hence baggage supported by said belt off of said apparatus onto a movable baggage transport means when said frame means is located at said unloading position and when said belt drive means is actuated, and sensor means coupled to said apparatus for sensing for the presence of items on the baggage transport means moving toward said apparatus when said frame means is at said unloading position and for actuating said belt drive means for moving baggage onto the baggage transport means if no items are sensed by said sensor means.

* * * * *